United States Patent [19]
Penzias

[11] Patent Number: 5,577,120
[45] Date of Patent: Nov. 19, 1996

[54] METHOD AND APPARATUS FOR RESTROSPECTIVELY IDENTIFYING AN INDIVIDUAL WHO HAD ENGAGED IN A COMMERCIAL OR RETAIL TRANSACTION OR THE LIKE

[75] Inventor: Arno A. Penzias, Chatham, N.J.

[73] Assignee: Lucent Technologies Inc., Murray Hill, N.J.

[21] Appl. No.: 431,732

[22] Filed: May 1, 1995

[51] Int. Cl.$^6$ .............................. H04K 1/00; H04L 9/00
[52] U.S. Cl. ............................. 380/23; 380/24; 380/25; 380/49
[58] Field of Search ............................. 380/23, 24, 25, 380/49, 51, 55

[56] References Cited

U.S. PATENT DOCUMENTS

| | | | |
|---|---|---|---|
| 4,993,068 | 2/1991 | Piosenka et al. | 380/23 |
| 5,337,358 | 8/1994 | Axelrod et al. | 380/23 |
| 5,384,846 | 1/1995 | Berson et al. | 380/23 |
| 5,420,924 | 5/1995 | Berson et al. | 380/23 |
| 5,469,506 | 11/1995 | Berson et al. | 380/23 |

*Primary Examiner*—Thomas H. Tarcza
*Assistant Examiner*—Hrayr A. Sayadian
*Attorney, Agent, or Firm*—Ronald D. Slusky

[57] ABSTRACT

Individuals are provided with a transaction card which is to be presented for at least certain classes of transactions, e.g., truck rentals, purchases of chemicals, etc. Encoded electronically within the card are a) physical verification information and b) identity information. The identity information is encrypted, to create an encrypted identity file, using an "identity encryption key." The matching "identity decryption key" is held in secret by an appropriate government agency or agencies. The encrypted identity file and the physical verification information are then commingled and encrypted together using the "public encryption key" of a so-called public key encryption/decryption pair to create a composite encrypted file. The matching "public decryption key" is distributed to the society at large and is, in particular, stored at points-of-sale/transaction.

When a transaction is entered into, the purchaser presents his/her transaction card to the vendor as a requirement for the completion of the transaction. The composite encryption file stored in the card is decrypted, yielding a) a "clear text" version of the physical identification information and b) the encrypted identity file, which is saved along with information about the transaction. The encrypted identity file can be decrypted only under court order at such time as an item or substance involved in a crime is traced back to the transaction in question. Even though the purchaser's identity information has been captured by the point-of-sale/transaction terminal, his/her privacy is maintained because the vendor cannot decrypt that information and therefore cannot actually read or display the information.

9 Claims, 2 Drawing Sheets

METHOD AND APPARATUS FOR RESTROSPECTIVELY IDENTIFYING AN INDIVIDUAL WHO HAD ENGAGED IN A COMMERCIAL OR RETAIL TRANSACTION OR THE LIKE

BACKGROUND OF THE INVENTION

The present invention relates to methods and apparatus for retrospectively identifying an individual who had engaged in a commercial, retail or other transaction so that that individual can be later found in the future.

Law enforcement officials are often aided in the solving of crimes if they are able to trace items found at a crime scene back to the store or other establishment (the "vendor") where the item was purchased or rented. Once the vendor has been identified, it may be possible for the sales and/or transaction records and/or the recollection of the sales personnel to be used to retrospectively identify the person who made the transaction. For example, individuals allegedly involved in the recent bombing of the World Trade Center in New York City were able to be tracked down once the vehicle identification plate of the rental truck that had held the bomb was found in the debris. In another example, one of the alleged perpetrators of the bombing of Pan American Flight 103 over Lockerbee, Scotland was able to be traced by virtue of clothing found at the crash site which was a) identified as having been in one of the perpetrators' suitcases and b) traced back to the store from which the clothing was bought. Incredibly, the store clerk actually remembered the appearance and demeanor of the individual who had purchased those clothes many months earlier and this ultimately led to identification of the perpetrator.

Investigational success stories like these are, however, all too infrequent. Even assuming that officials are able to track an item or substance found at a crime scene back to the vendor, it is typically not possible to reliably identify the person who made a purchase. Cash transactions, for example, typically do not involve a disclosure by the purchaser of his/her identity to the vendor. Moreover, even where a name or address is requested as part of the transaction, it is generally possible for the purchaser to give false information—indeed possibly supplying stolen or counterfeit credentials in the process. Non-cash, e.g., credit card, transactions do result in a recordation of the credit card number, which can then be used to immediately identify the card holder's name and address from the card issuer's database. However, the credit card may well have been stolen from a bona fide, law abiding citizen. Of course, it might be possible that a sales clerk will remember something about a purchaser which can aid in his/her apprehension, as happened in the Lockerbee investigation. This will not, however, usually be the case—particularly when the item is sold in large volume to many purchasers in the course of a day.

It nonetheless remains the fact that as acts of lawlessness and terrorism continue to increase, public pressure for our governmental agencies to "do something" is also going to increase.

One way in which our officials might respond is to attempt to develop techniques which would allow them to more reliably identify purchasers and renters of items and substances found at crime scenes. For example, one proposal might be to issue so-called national identity cards for everyone in a society and require that card to be shown—and its number recorded—for every commercial and retail transaction. Indeed, such a card could include electronically encoded information relating to one or more physical characteristics of the person, e.g. a fingerprint or voice print, that could be used at the point of sale to verify that the person presenting the card is, indeed, the person to whom the card was issued.

There are, however, significant problems—both technological and sociological—with this approach. For example, the possibility of counterfeiting still remains. In fact, given the ever increasing technological sophistication of the world's criminal population, forgery of such cards would not only be possible, but inevitable. Moreover, the mere notion of such an identity card would be regarded as an undue and intolerable invasion of privacy by most Americans. People in this country continue to the value highly their right to remain anonymous to the maximum extent possible. This is evidenced, for example, by the fact that even as we have seemingly resigned ourselves to the erosion of our privacy and anonymity due to the ever increasing proliferation of computers and databases, a countervailing trend has produced such privacy-protecting legislation and regulations as those which guarantee citizens the right to block their telephone numbers from being displayed on a called party's "caller ID" unit and which establish the right of a consumer to refuse to provide a merchant with his/her telephone number as part of a credit card transaction.

It will thus be appreciated that any attempt to more comprehensively and reliably record and/or memorialize the identity of persons engaging in commercial, retail and other transactions will, in order to be successful and accepted, have to address at least the above-described issues of a) counterfeit identifications, and b) individual privacy.

SUMMARY OF THE INVENTION

The present invention addresses and solves those problems. In an illustrative embodiment of the invention, individuals are provided with a transaction device—illustratively a transaction card—which is to be presented for at least certain classes of transactions, e.g., truck rentals, purchases of chemicals, etc. Encoded electronically within the card are two kinds of information—a) physical verification information and b) identity information. The physical verification information is information relating to one or more physical characteristics of the individual, e.g. height, weight, sex, race, eye/hair color, fingerprint, iris image, or voice print. The identity information is information that would be useful for actually finding the individual in the future, such as the individual's name and address, or at least a "pointer," such as a social security number, that can be used to access a file stored elsewhere containing the name, address, complete physical description, digitized photograph, fingerprints, etc., of the individual.

The physical verification information and the identity information are both encrypted—in respective different ways—prior to being stored within the card. In particular, the identity information is encrypted, to create an encrypted identity file, using a particular encryption key—referred to herein as the "identity encryption key." The matching "identity decryption key" is held in secret by an appropriate government agency. (Alternatively, the "identity decryption key" can be split into two or more parts which are given to respective different agencies, as is done today in the case of the so-called "Clipper Chip," thereby providing the citizenry with an added measure of security against untoward government invasion of privacy, as will be more fully appreciated as this description continues.) The encrypted identity file and the physical verification information are then commingled and encrypted together using the "public encryption key" of a so-called public key encryption/decryption pair to create a composite encrypted file. The "public encryption key" is maintained in secret by a governmental authority issuing the card. The matching "public decryption key" is distributed to the society at large and is, in particular, stored at points-of-sale/transaction.

When a transaction is entered into, the purchaser presents his/her transaction card to the vendor as a requirement for the completion of the transaction. The card may be devoid of any humanly readable indicium by which the purchaser's identity could be discerned (e.g., his/her name), so that the purchaser's privacy is not violated by virtue of the mere presentation of the transaction card. The latter is placed in a point-of-sale/transaction terminal, which decrypts the composite encryption file stored in the card, yielding a) a "clear text" version of the physical identification information and b) the encrypted identity file. The vendor compares the physical information to the corresponding physical characteristic(s) of the purchaser. For example, the physical characteristic may be the individual's thumbprint and the purchaser may be required to place his/her thumb over an optical device which "reads" the thumbprint. If the thumbprint thus "read" matches the one stored in the card, the person presenting the card is assured to be the person to whom the card was issued. Moreover, since the nature of a public key encryption scheme is that it is not possible to reconstruct the encryption key given a knowledge of the decryption key, it is not possible for the transaction card to be counterfeited because it will not be possible to generate an encrypted thumbprint which will be able to be validly decrypted using the "public decryption key." Thus the first problem—that of counterfeit transaction cards—is avoided.

The point-of-sale/transaction terminal also causes the encrypted identity file which was recovered when the composite encrypted file was decrypted using the "public decryption key" to be stored or otherwise saved in combination with information about the transaction itself, e.g., an identification of what was purchased, the date, etc. However, the point-of-sale/transaction terminal cannot decrypt the identity information that is has just captured it because that information was encrypted with the "identity encryption key," and the matching "identity decryption key" is possessed only by a government agency (or agencies). Thus even though the purchaser's identity information has been captured by the point-of-sale/transaction terminal, his/her privacy is maintained because the vendor cannot decrypt that information and therefore cannot actually read or display the information. Thus the problem of maintaining individual privacy is also solved.

Moreover, it is significant to note that because the identity information has been doubly encrypted—once with the identity encryption key and then with the public encryption key—it is not possible for someone to alter the identity information without also corrupting the physical verification information. Thus, it is not possible for a criminal to take a valid transaction card and then alter the identity information therein without also concomitantly corrupting the physical verification information, thereby making it apparent that the card was tampered with.

The identity information can only be decrypted when a governmental agency has traced some crime scene item or substance to a particular vendor. It is only at that point that, the agency, pursuant, for example, to a court order can apply the "identity decryption key" to the captured identity information that it obtains from that vendor's records to thereby obtain the identity information for particular purchasers so that it can proceed with its investigation. (If the identity decryption key had been separated into parts, as suggested above, the court order will have allowed for the release of those various parts to the investigating agency for reassembly prior to the identity decryption operation.) It is thus only in the rarest of circumstances, and under carefully controlled conditions, that the individual's identity information will be able to be decrypted and examined.

DETAILED DESCRIPTION

Figure 1:
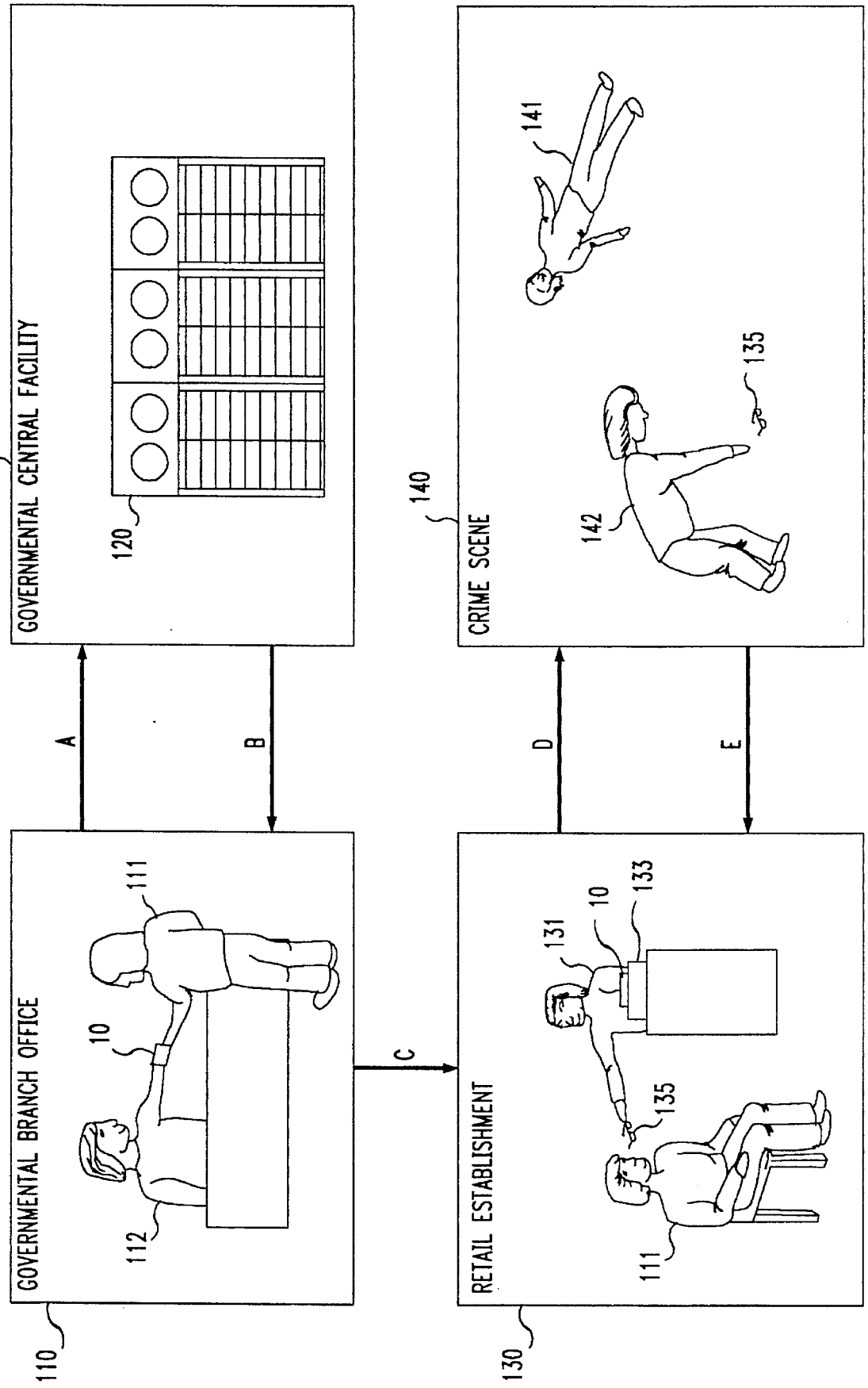
FIG. 1 is a pictorial depiction of steps undertaken by various parties in the course of the identification of the perpetrator of a crime, pursuant to the principles of the invention.
Figure 2:
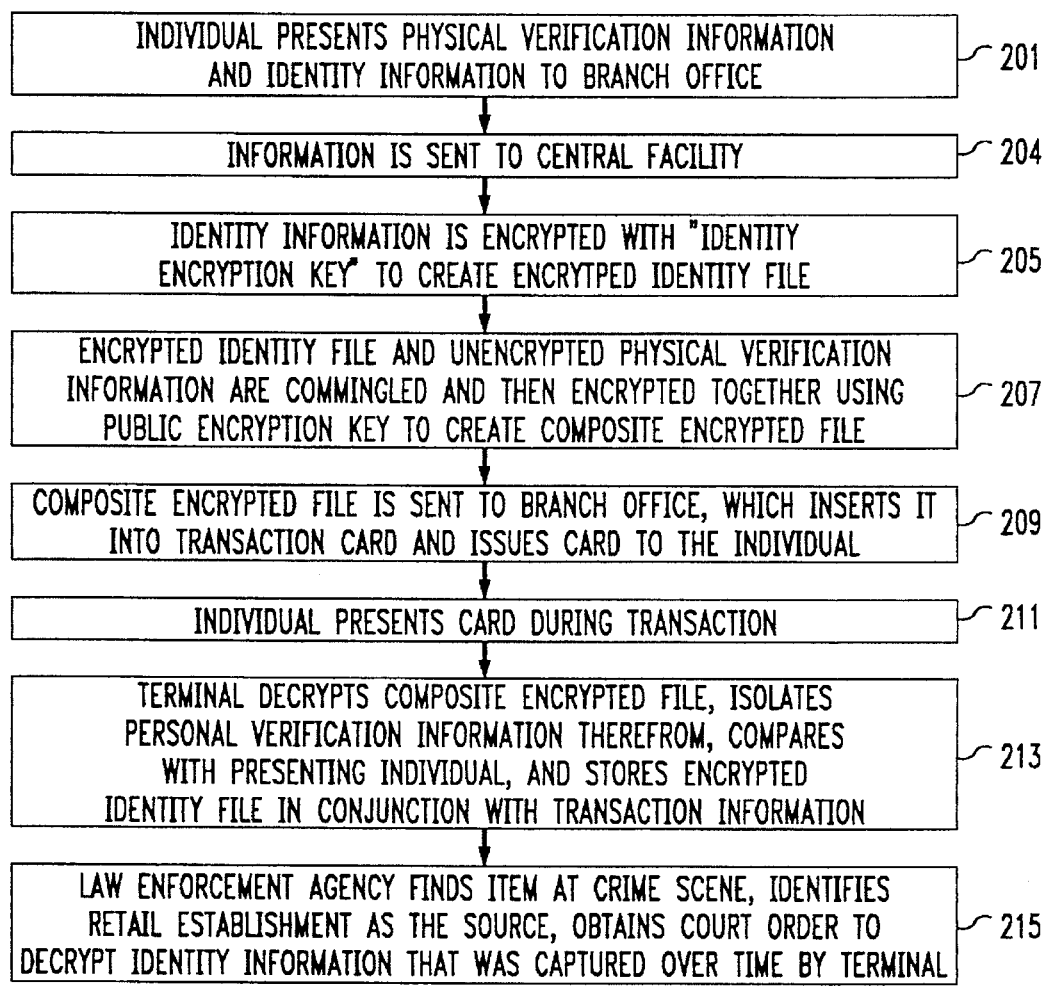
FIG. 2 is a flowchart representation of those same steps and should be considered in conjunction with FIG. 1.

The overall process in which the invention is implemented begins with the issuance of a transaction card to individuals desiring to engage in commercial and/or retail transactions. (In a developed country, this will include the vast majority of people in the society.) As shown in FIG. 1 and as indicated at block 201 of FIG. 2, the individual 111 presents him/herself to a clerk 112 at a branch office 110 of a government agency which issues transaction cards of the type to be described. The agency is illustratively the United States Department of Commerce. Two kinds of information are obtained from and/or about individual 111 at this time—physical verification information and identity information. The physical verification information is information relating to one or more physical characteristics of the individual. Illustratively it is the thumbprint of the individual, an ink impression of which is made on a card by clerk 112 or other agency employee. Other physical characteristics could include height, weight, sex, race, eye/hair color, iris image, or voice print. The identity information is information that would be useful for actually finding the individual in the future, such as the individual's name and address, or at least a "pointer," such as a social security number, that can be used to access a file stored elsewhere containing the name, address, complete physical description, digitized photograph, fingerprints, etc., of the individual. The accuracy of the physical description, for example, is ensured by virtue of the fact that the clerk can observe the individual and make certain physical observations about height, weight, sex, race, eye and hair color, etc. The accuracy of a photograph in terms of being a good likeness of individual 111 could be guaranteed by taking the photograph at the branch office itself. It is more difficult to ensure that such other identity information supplied by the individual as higher name, address, social security number are not erroneous. Such measures as are currently used to verify a person's identity—such as the presentation of a birth certificate—could be used here. However, if a greater measure of security against fraud is desired, the processing performed by branch office 110 could include such further measures as obtaining a full set of fingerprints from the individual and obtaining the person's identity from the Federal Bureau of Investigation (FBI), at least for those individuals whose prints are on file.

Once the physical verification information and the identity information have been obtained, branch office 110 electronically transmits the information—including a scanned and digitally processed version of any graphical information such as the thumbprint and photograph—to a computer 121 maintained at a central Department of Commerce facility 120, as indicated by flow arrow A. As indicated at block 204, the physical verification information and the identity information are encrypted by computer 121. In particular, as indicated at block 205, the identity information is encrypted, to create an encrypted identity file, using a particular encryption key—referred to herein as the "identity encryption key." The matching "identity decryption key" is held in secret by an appropriate government agency (or agencies). As indicated at block 207, computer 121 thereupon commingles and encrypts a) the encrypted identity file and b) the physical verification information together using the "public encryption key" of a so-called public key encryption/decryption pair to create a composite encrypted file. This encryption key—referred to herein as the "public encryption key"—is maintained in secret by the Department of Commerce. The matching "public decryption key," however, is distributed to the society at large and is, in particular, stored at points-of-sale/transaction, such as within point-of-sale/transaction terminal 133 described below. The identity information is encrypted using a second encryption key, referred to herein as the "identity encryption key." The matching "identity decryption key" is held in a state of secrecy by an appropriate government agency, such as the FBI. Alternatively, as in the case of the so-called "Clipper Chip," the "identity decryption key" can be split into two or more parts which are given to respective different agencies so that no one agency can decrypt the identity information by itself.

Computer 121 may also advantageously keep a record of all the physical and identity information that it receives for possible later use, as described below.

Figure 3:
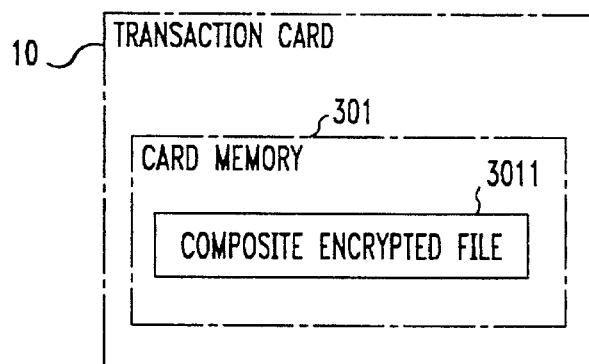
FIG. 3 depicts a transaction card used in the process.

As indicated by flow arrow B and step 209, the composite encrypted file is electronically transmitted back to branch office 110 and inserted onto a transaction card 10 which is thereupon issued, i.e., handed, to individual 111. Transaction card 10 may be any one of a number of known types of so-called "smart cards" which have the capability of storing information in electronic form for subsequent readout by an appropriate card reader/terminal. Thus as shown in FIG. 3, transaction card 10 includes, at a minimum, a card memory 301 having stored therein the composite encrypted file 3011. As is well known, a card of this type may be more than just a data repository; it may have processing capability of its own. Indeed, in alternative embodiments of the invention, much of the processing described herein as being carried out by point-of-sale/transaction terminal 133 could be carried out within transaction card 10 instead.

At some future time, as indicated by flow arrow C and block 211, individual 111 later enters into a transaction—in this example, the purchasing of a pair of prescription sunglasses at a retail establishment 130. As a requirement for the completion of the transaction, individual 111 purchaser presents transaction card to the vendor—in this example, optometrist 131. The latter places the card in point-of-sale/transaction terminal 133. Transaction card 10 is illustratively devoid of any humanly readable indicium by which the purchaser's identity could be discerned (e.g., his/her name), so that the purchaser's privacy is not violated by virtue of the mere presentation of the transaction card. (At the individual's option, however, the outside surface card may include some symbol, color pattern or other indicium which will help individual 111 identify the card as being his/hers if it should get mixed in with other cards, e.g., within a household.)

Terminal 133 includes a small scanner window (not shown) onto which individual 111 places his/her thumb. An optical device within point-of-sale/transaction terminal 133 "reads" the thumbprint. At the same time, as indicated at block 213, point-of-sale/transaction terminal 133 reads the composite encrypted file 3011 from memory 301 of transaction card 10 and uses the publicly known "public decryption key" to recover a "clear text" version of the physical verification information—thumbprint, in this case. (The clear text physical verification information may be set off by a predetermined delimiter to enable point-of-sale/transaction terminal 133 to isolate it from the encrypted identity file.) The recovered thumbprint is then compared with the thumbprint that was scanned. If the thumbprint that was scanned matches the one stored in the card, the person presenting the card is assured to be the person to whom the card was issued. If there is no match, then the vendor does not allowing the transaction to continue. (In other embodiments, in which the physical verification information may be only textual information such as height, weight, sex, race, etc., the point-of-sale/transaction terminal will include a display screen on which that textual information will be displayed so that a clerk can compare that description to the physical characteristic(s) of the card presenter.)

Since the nature of a public key encryption scheme is that it is not possible to reconstruct the encryption key even given a knowledge of the decryption key, it is not possible for the transaction card to be counterfeited because it will not be possible to generate an encrypted thumbprint which will be able to be validly decrypted using the "public decryption key." It is thus seen, first of all, that the problem of counterfeit transaction cards is avoided.

As further indicated at block 213, point-of-sale/transaction terminal 133 also causes the encrypted identity file which was recovered when the composite encrypted file was decrypted using the "public decryption key" to be stored or otherwise saved in combination with information about the transaction itself, e.g., an identification of what was purchased, the date, etc. This information may be retained within point-of-sale/transaction terminal 133 itself but, more likely, will be transmitted to a computer or other storage device maintained by retail establishment 130 along with information previously captured by terminal 133 and other similar terminals maintained on the vendor's premises. Importantly, however, point-of-sale/transaction terminal 133 cannot decrypt identity information 3012 because that information was encrypted with the "identity encryption key," and the matching, "identity decryption key" is possessed only by, in this example, the FBI and is maintained in a state of secrecy. Thus even though the purchaser's identity information has been captured by the point-of-sale/transaction terminal, his/her privacy is maintained because vendor 130 cannot decrypt that information and therefore cannot actually read or display it. Thus the problem of maintaining individual privacy is also solved.

Moreover, it is significant to note that because the identity information has been doubly encrypted—once with the identity encryption key and then with the public encryption key—it is not possible for someone to alter the identity information without also corrupting the physical verification information. Thus, it is not possible for a criminal to take a valid transaction card and then alter the identity information therein without also concomitantly corrupting the physical verification information, thereby making it apparent that the card was tampered with.

Consider now what happens when individual 111 leaves retail establishment 130 with his/her new pair of sunglasses 135, as indicated by flow arrow D and, at some later time, commits a crime at crime scene 140, leaving victim 141 lying on the ground but also inadvertently leaving sunglasses 135. As indicated at block 215, the sunglasses are collected at the scene by criminalist 142. Using conventional investigation techniques, the police will often be able to trace sunglasses 135 back to retail establishment 130, as indicated by flow arrow E and the transaction record for those sun glasses can be readily found within the vendor's records. At this point, law enforcement authorities must obtain a court order, based on so-called probable cause, allowing the of the "identity decryption key" (or its various distributed parts) from its state of secrecy so that it can be used to decrypt and thus recover the identity information that was captured at the time of the transaction. That information—possibly in conjunction with other identity and/or physical description information that was collected at the time of card issuance and stored away by computer 121—can then be used to find individual 111 within the population. It is thus only in the rarest of circumstances, and under carefully controlled conditions, that an individual's identity information captured during a retail or commercial transaction will be able to be decrypted and examined; it will, rather, almost invariably remain undecrypted.

This approach is similar to that which is currently in effect for the so-called "Clipper Chip" wherein law enforcement officials desiring to wiretap an encrypted telecommunications transaction must obtain a court order which allows them to a) effectuate the wiretap and b) use the assembled parts of a decryption key to decipher the communications.

The foregoing merely illustrates the principles of the invention. For example, a society may require use of the transaction card by law for all retail and commercial transactions, since it cannot be known until after the fact what kind of items and/or substances may be left behind by the perpetrator. Alternatively, however, required use of the card may be limited to certain types of transactions which are more likely than others to be of ultimate investigatory value, e.g., truck rentals, purchases of dangerous instrumentalities, such as knives, purchases of chemicals, etc. Another possibility would be not to mandate use of the transaction card by law but, rather, to rely on societal pressure and/or commercial self-interest to motivate vendors to insist that transaction cards be presented by prospective purchasers of goods and services. Certainly in the case of the rental of expensive items such as trucks, it is in the vendors' interest to see that criminals who use, and often destroy, the rented item be apprehended.

In order to provide the citizenry with an added measure of security against untoward government invasion of privacy, the scanning of, say a thumbprint could be restricted to only a segment thereof—enough to verify that the person is who he/she claims to be, but not enough to allow the individual's anonymity to be compromised by having so much thumbprint information available that that person could be tracked out of the entire population of the country. Yet further security could be provided, in the case where the identity decryption key is divided into two or more parts, by having at least one of those parts entrusted to a "trusted" non-governmental agency.

Moreover, although the above description assumes the use of a so-called "smart card," other devices or technologies could be used to hold the encrypted information.

It will thus be appreciated that although the invention is disclosed herein in the context of a particular illustrative embodiment, those skilled in the art will be able to devise numerous alternative arrangements which, although not explicitly shown or described herein, embody the principles of the invention and are thus within its spirit and scope.

I claim:

1. A transaction device which has stored thereon electronically readable data, said data comprising a composite encrypted file comprised of a) physical verification information about an individual and b) an encrypted identity file, said composite encrypted file having been created by encrypting, together, said physical verification information and said encrypted identity file using a public key encryption key whose matching decryption key is publicly known, said encrypted identity file including identity information relative to said individual, said encrypted identity file having been created by encrypting said identity information with an encryption key whose matching decryption key is not publicly known.

2. The invention of claim 1 wherein said physical verification information includes a fingerprint of said individual.

3. The invention of claim 1 wherein said physical verification information includes an iris image.

4. The invention of claim 1 wherein said identity information includes the name and address of said individual.

5. A method comprising the steps of receiving a transaction device having stored thereon electronically readable data, said data including a composite encrypted file comprised of a) physical verification information about an individual and b) an encrypted identity file, said composite encrypted file having been created by encrypting, together, said physical verification information and said encrypted identity file using a public key encryption key whose matching decryption key is publicly known, said encrypted identity file including identity information relative to said individual, said encrypted identity file having been created by encrypting said identity information with an encryption key whose matching decryption key is not publicly known and is maintained in a state of secrecy, reading said composite encrypted file from said device, decrypting the composite encrypted file information thus read, isolating a clear text version of said physical verification information from the file thus decrypted, comparing said clear text version of said physical verification information to at least one corresponding physical characteristic of a presenting individual to determine if said presenting individual is the same person as said particular individual, and if the result of said comparing is that said presenting individual is the same person as said particular individual, then isolating said encrypted identity file from the decrypted composite encrypted file and storing said isolated encrypted identity file in association with information stored about a transaction being entered into by said presenting individual.

6. The invention of claim 5 wherein said information about said transaction includes the identification of goods or services purchased by said presenting individual.

7. The invention of claim 6 wherein said physical verification information includes a fingerprint of said individual.

8. The invention of claim 6 wherein said physical verification information includes an iris image.

9. The invention of claim 6 comprising the further steps of retrieving said stored encrypted identity file, obtaining a release of said non-publicly known decryption key from said state of secrecy, and using the thus-released non-publicly-known decryption key to decrypt said stored encrypted identity file, whereby the individual who was engaged in said transaction can be identified after said goods or services have been associated with a crime scene, while the identity information of individuals who have not been involved in criminal activity remains undecrypted.

* * * * *

UNITED STATES PATENT AND TRADEMARK OFFICE
CERTIFICATE OF CORRECTION

PATENT NO. : 5,577,120
DATED : Nov. 19, 1996
INVENTOR(S) : Arno A. Penzias

It is certified that error appears in the above-identified patent and that said Letters Patent is hereby corrected as shown below:

Title page item [73], should read --Assignee: Lucent Technologies Inc., Murray Hill, NJ and AT&T Corp., New York, NY.--

Signed and Sealed this

Seventeenth Day of October, 2000

Attest:

Q. TODD DICKINSON

*Attesting Officer*    *Director of Patents and Trademarks*